Feb. 4, 1964        J. M. RIEBE ET AL        3,120,361
LANDING ARRANGEMENT FOR AEROSPACE VEHICLE
Original Filed May 2, 1960
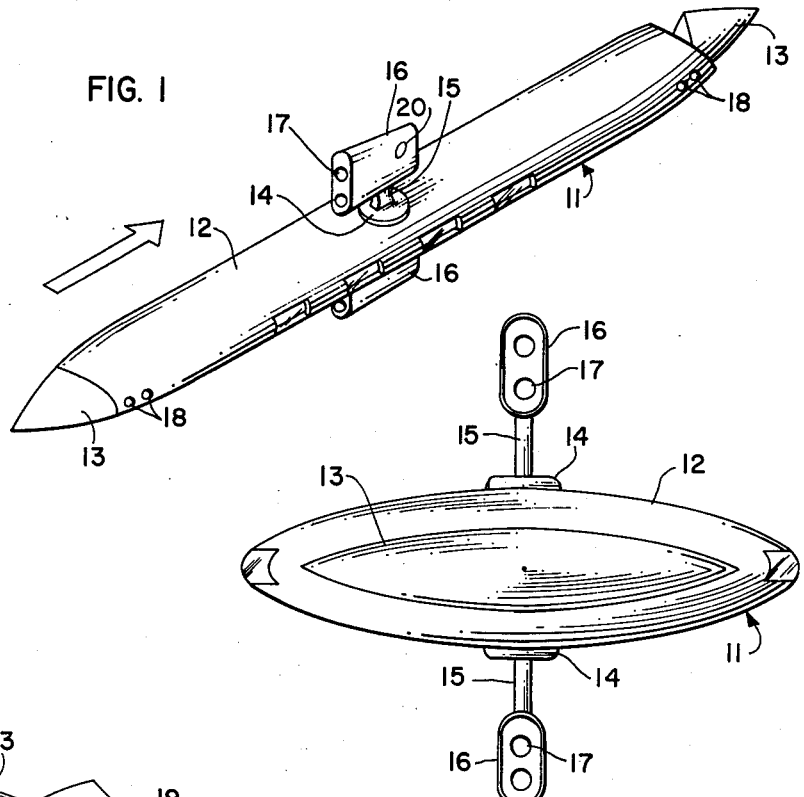
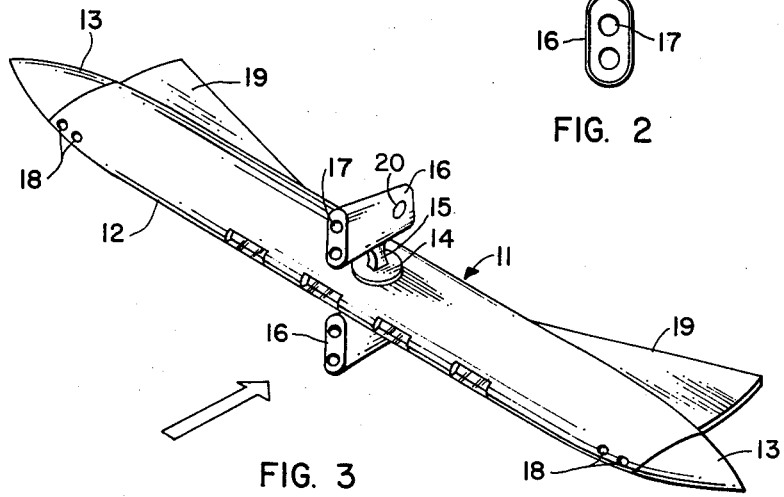
INVENTORS
JOHN M. RIEBE
VERNARD E. LOCKWOOD
BY
ATTORNEYS United States Patent Office 3,120,361
Patented Feb. 4, 1964

3,120,361
LANDING ARRANGEMENT FOR AEROSPACE
VEHICLE
John M. Riebe, Newport News, and Vernard E. Lockwood, Hampton, Va., assignors to the United States of America as represented by the Administrator of the National Aeronautics and Space Administration
Original application May 2, 1960, Ser. No. 26,375, now Patent No. 3,028,122, dated Apr. 3, 1962. Divided and this application Mar. 22, 1962, Ser. No. 181,829
5 Claims. (Cl. 244—46)
(Granted under Title 35, U.S. Code (1952), sec. 266)

The invention described herein may be manufactured and used by or for the Government of the United States of America for governmental purposes without the payment of any royalties thereon or therefor.

This application is a division of our copending application Serial No. 26,375, filed May 2, 1960, to be issued April 3, 1962 as Patent No. 3,028,122.

This invention relates generally to aerospace vehicles capable of very high speed flight within and above the earth's atmosphere and also having low speed flight capabilities for takeoff from and landing upon presently existing airfields.

The speed capabilities of aircraft have rapidly advanced in recent years as a result of increased knowledge and experience in the fields of aerodynamics and propulsion. The speed of missiles and rockets has increased enormously with the evolution of massive and highly efficient powerplants, and now vehicles capable of escape velocity and ultimate operation in deep space are being designed and fabricated. Such of these vehicles that must be operated within the earth's atmosphere, however, as in takeoff and landing, have heretofore been designed to comply with the requirements of high speed aerodynamics, which are generally incompatible with the characteristics of configurations designed for low speed takeoff and landing. The present invention is the result of a positive approach to resolve this design difficulty, and establishes an aerodynamic configuration for an aerospace vehicle having a planform variable in flight between a low aspect ratio attitude for high speed flight and a high aspect ratio attitude with high aerodynamic lift and low drag for low speed takeoff or landing of such vehicle. This invention is further directed to the provision of means for increasing the aerodynamic lift of the vehicle when positioned in such high aspect ratio attitude.

Accordingly, it is an object of the present invention to provide an aerospace vehicle configuration positionable in a low aspect ratio attitude for high speed flight.

Another object of the instant invention is the provision of an aerospace vehicle or spacecraft configuration positionable in a high aspect ratio attitude for low speed flight, takeoff, or landing.

A still further object of the present invention is the provision of a new and improved variable planform configuration for aerospace vehicles characterized by large in flight aspect ratio variation capabilities.

Another still further object of the instant invention is the provision of a new and improved variable planform configuration for aerospace vehicles and spacecraft characterized by large in flight aspect ratio variation capabilities, and further characterized by aerodynamic lift capabilities exceeding the increase in lift obtainable by increasing the aspect ratio thereof.

According to the present invention, the foregoing and other objects are attained by providing an aerospace vehicle capable of powered movement through the atmosphere with an elongated fuselage or hull section, jet means for yawing the fuselage section while in flight between a low aspect ratio position substantially in alignment with the direction of movement of the vehicle and a high aspect ratio position substantially transverse to the direction of movement of the vehicle, and also means operable to increase aerodynamic lift generated by the vehicle when the fuselage or hull section thereof is positioned substantially transverse to the direction of movement of the vehicle through the atmosphere.

A more complete appreciation of the invention and many of the attendant advantages thereof will be readily apparent as the same becomes better understood by reference to the following detailed description when considered in connection with the accompanying drawing wherein:

FIG. 1 is an isometric view of the aerospace vehicle configuration in a low aspect ratio flight attitude;

FIG. 2 is a front elevational view of the vehicle of FIG. 1 in the attitude shown therein; and FIG. 3 is an isometric view of the vehicle of FIG. 1 in a high aspect ratio flight attitude.

Referring now more particularly to the drawing, wherein like reference numerals designate identical parts throughout the several views, there is shown an aerospace vehicle, generally designated by the reference numeral 11. Vehicle 11 includes an elongated fuselage or hull section 12, preferably elliptical in cross-section and tapering to some extent from its midpoint toward the ends thereof in cross-sectional area. A tip control panel 13 is mounted at each end of fuselage section 12 to rotate about an extension of the longitudinal axis thereof; the panels 13 forming extensions of section 12 and symmetrically tapering rather rapidly from base sections adjacent to and congruent with the ends of fuselage section 12 to a point on the longitudinal centerline extension. At the longitudinal midpoint of fuselage section 12 and on the longitudinal centerline thereof, a pair of rotatable mounts 14 are provided; one mount 14 being positioned on the upper surface and one mount 14 being positioned on the lower surface of section 12. The mounts 14 are mounted to rotate about a common axis, and a pylon 15 is connected to the outer surface of each mount 14 and projects outwardly therefrom. A reaction motor pod 16 is connected to the outer extremity of each pylon 15, and one or more motors 17 are mounted in each pod 16 in such a manner that the line of thrust of each motor 17 is spaced from and substantially parallel to the longitudinal axis of fuselage section 12 when the pods 16 are disposed in the position shown in FIGS. 1 and 2. Pods 16 are provided with means 20 for rotating pods 16 relative to fuselage section 12 on mounts 14. Means 20 can be any conventional means for rotating pods 16. For example, it can be jet devices which direct jet blasts transversely with respect to the longitudinal axis of pods 16 or it can be a gear driven mechanism. Fuselage section 12 is also provided with yaw control jet devices, each having one or more nozzles 18, located on one side edge thereof adjacent each end thereof equidistant from the midpoint of fuselage section 12. Nozzles 18 are arranged to selectively direct jet blasts transversely with respect to the longitudinal axis of section 12 to create a yawing moment about the center of gravity of vehicle 11 to change the heading thereof with respect to its direction of movement. Fuselage section 12 is also provided with a pair of lift augmentation flap control devices 19 mounted to pivotally project from the side edge thereof opposite the edge provided with nozzles 18; there being one flap positioned near each end of section 12. Each flap 19 is normally positioned within section 12 in a recess provided therefor adjacent a slot in the edge of the section. The inner end of each flap is pivotally connected to the structure of section 12, and means are provided for swinging the other end of each flap 19 from its recess to the position seen in FIG. 3. Vehicle 11 is also provided with suitable landing gear, not shown, as well as suitable conventional means such as directional jets, control surfaces, or the like, not shown, for assuring adequate pitch and roll control of vehicle 11.

At the commencement of a flight mission vehicle 11 is positioned for takeoff from the ground in the attitude shown in FIG. 3, with the longitudinal axis of fuselage section 12 positioned athwart the relative wind, the direction of which is indicated by the arrow. For takeoff, the tip panels 13 may also be deflected to provide a more efficient lifting arrangement. When vehicle 11 is airborne, flaps 19 are retracted, and the port yaw control jet device is operated to direct a blast from the nozzles 18 thereof to yaw the fuselage section 12. Simultaneously with the yawing of section 12, mounts 14 are rotated in the opposite direction at a substantially equal rate by means 20 to maintain the heading of motors 17 into the relative wind. During the yawing of fuselage section 12, the tip panels 13 may be operated as ailerons for more positive turn and bank control. When vehicle 11 reaches the attitude shown in FIGS. 1 and 2, the aspect ratio of the vehicle has been drastically reduced, with a corresponding increase in performance capability at high speed. In the high speed flight attitude, the aftermost tip panel may be rotated 90 degrees with respect to fuselage section 12 to serve as a vertical stabilizer, as shown in FIG. 1. Upon completion of the flight mission, vehicle 11 is headed toward its landing area, the hereinbefore described yawing operation is performed in reverse, and the vehicle is landed in the high aspect ratio attitude in which takeoff was accomplished.

It will be apparent that the jet yaw control devices herein illustrated and described have been disclosed only by way of illustration, and not limitation, and that the invention contemplates the utilization of other suitable devices similarly operable and deemed well known in the art.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An aerospace vehicle capable of movement through the atmosphere, comprising an elongated fuselage section, propulsion means rotatably mounted externally of said fuselage section operable for generating thrust in at least one plane substantially parallel to a horizontal plane passing through said fuselage section at substantially the vertical midpoint thereof, means for yawing said fuselage section while said vehicle is in flight between a low aspect ratio position and a high aspect ratio position through a yaw angle substantially equal to the angular rotative capabilities of said propulsion means relative to said fuselage section, and a control surface carried by said fuselage section adjacent each end thereof.

2. The aerospace vehicle as defined in claim 1, and including means carried by said fuselage section for augmenting aerodynamic lift when said fuselage section is positioned in said high aspect ratio position.

3. An aerospace vehicle capable of movement through the atmosphere, comprising an elongated fuselage section, propulsion means rotatably mounted externally of said fuselage section operable for generating thrust in at least one plane substantially parallel to a horizontal plane taken through the longitudinal centerline of said fuselage section, said propulsion means being rotatable through substantially a right angle from a position in which thrust is directed substantially parallel to said longitudinal centerline, means for yawing said fuselage section in said horizontal plane while in flight between a low aspect ratio position substantially in alignment with the direction of movement of said vehicle and a high aspect ratio position substantially transverse to said direction of movement, and means operable for augmenting aerodynamic lift when said fuselage section is positioned substantially transverse to said direction of movement.

4. The aerospace vehicle as defined in claim 3, and including a control surface positioned at each end of said fuselage section in the form of linear extensions thereof, each of said control surfaces being rotatably connected to said fuselage section to symmetrically revolve with respect to the longitudinal centerline thereof.

5. The aerospace vehicle as defined in claim 3, wherein said lift augmentation means comprises a flap retractably positioned in said fuselage section adjacent each end thereof and operably extensible outwardly therefrom substantially in said horizontal plane.

References Cited in the file of this patent

FOREIGN PATENTS 866,143  Germany _____ Feb. 9, 1953